United States Patent Office 2,867,144
Patented Jan. 6, 1959

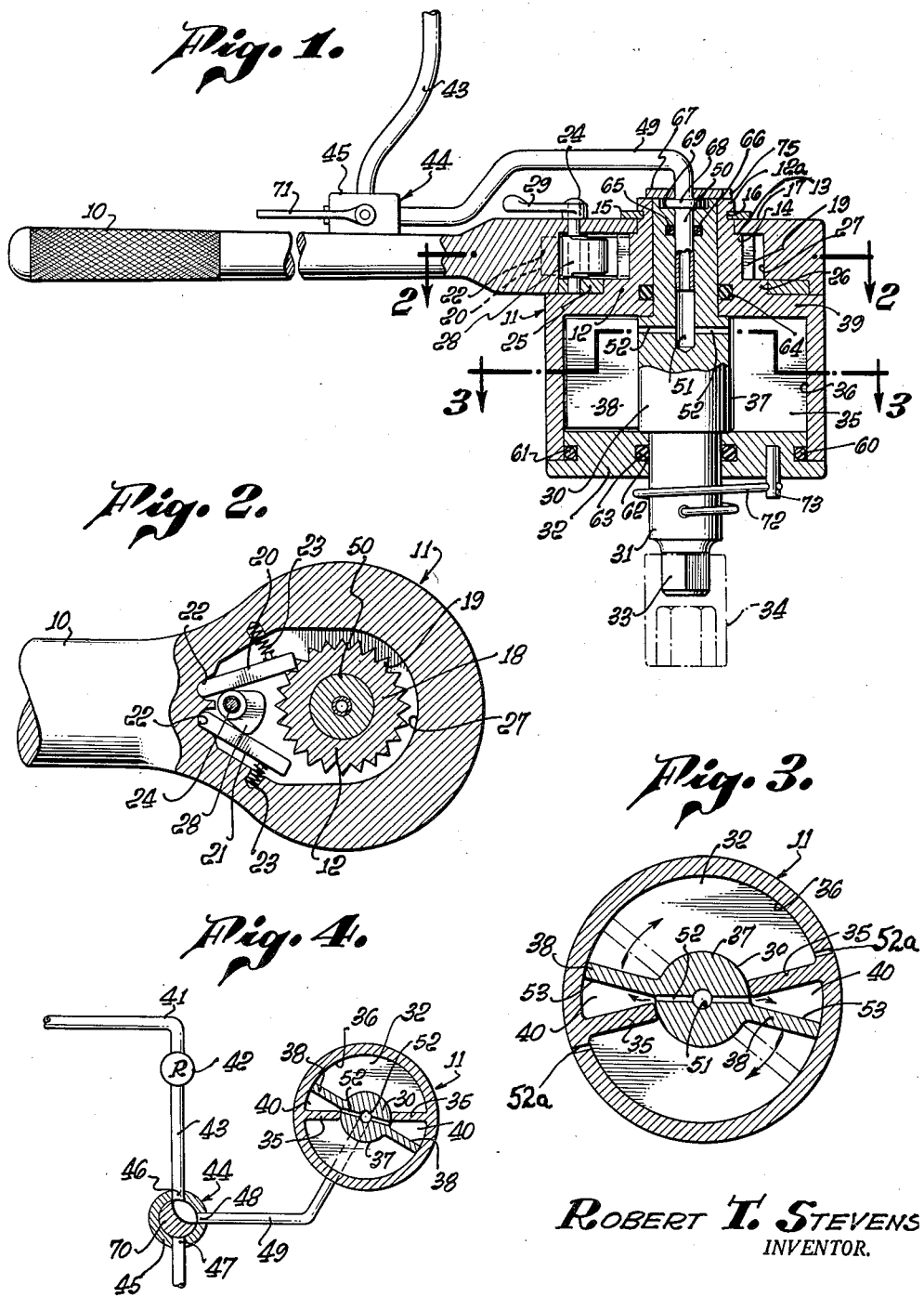

2,867,144

POWER OPERATED APPARATUS FOR TIGHTENING THREADED FASTENING ELEMENTS

Robert T. Stevens, Altadena, Calif., assignor, by decree of distribution, to Adele M. Stevens, executrix of the estate of Dillon Stevens, deceased Application October 20, 1952, Serial No. 315,794

10 Claims. (Cl. 81—52.4)

The present invention relates to apparatus for tightening threaded fastening elements, such as screws, nuts, bolts, studs, and the like.

An object of the present invention is to provide an improved apparatus for tightening threaded fastening elements, which is capable of effecting tightening to the desired torque with a great degree of accuracy.

Another object of the invention is to provide apparatus for tightening threaded fastening elements, which is manually manipulable for tightening the element to a predetermined lower torque value, and which can then be power operated to tighten the elements finally and with accuracy to a higher torque value.

A further object of the invention is to provide apparatus for tightening threaded fastening elements, which is manually manipulated by the operator, but in which the final torque to which an element is tightened is independent of the operator's actions or skill.

Still another object of the invention is to provide apparatus for tightening threaded fastening elements to a predetermined torque value, which is manually manipulated by the operator, and in which less operating space and effort are required in accomplishing the desired tightening.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is a longitudinal section, with parts in elevation, of one form of invention embodying the invention;

Fig. 2 is a cross-section taken along the line 2—2 on Fig. 1;

Fig. 3 is a cross-section taken along the line 3—3 on Fig. 1;

Fig. 4 is a diagrammatic view of a hydraulic system for operating the hydraulic portion of the apparatus.

In the form of the invention illustrated in the drawings, a threaded fastening element (not shown) is to be tightened to a desired torque value. The apparatus itself may be manually operated for the purpose of tightening the apparatus to a preliminary extent that is less than the final torque value desired. Thereafter, power means are provided for finally tightening the threaded fastening element, such power means being relatively slow acting and having very little inertia, so as not to interfere with the accuracy of the tightening.

The apparatus includes an operating handle or lever 10 which is pivotally mounted on an outer housing or stator 11 of the hydraulic portion of the mechanism disclosed. Thus, the inner portion of the handle is piloted over the stator hub 12 and has a flange 13 engaging a stop shoulder 14 on the latter, the lever being retained in position by a suitable split snap ring 15 disposed in a groove 16 in the hub and overlying the outer face 17 of the operating lever.

The motion of the operating lever 10 is transmitted to the outer housing or stator 11 of the hydraulic mechanism through a pawl and ratchet device, which is illustrated in the drawings as being of a reversible type, in order that the oscillations of the operating lever 10 may transmit unidirectional motion to the stator in either selected direction. Thus, the hub portion 12 of the stator has a ratchet 18 integral therewith, or otherwise suitably secured thereto, whose teeth 19 are selectively engageable by power pawls 20, 21, these power pawls being carried by the operating lever 10. Each power pawl has its outer end fitting within a socket 22 in the lever, its inner end being urged into engagement with the ratchet teeth 19 by a compression spring 23 bearing against the inner portion of the pawl and also against the operating lever itself.

It is to be noted that the pawls 20, 21 are engageable with the ratchet teeth 19 on opposite sides of the longitudinal central plane through the operating lever and the axis about which it is oscillatable, in order to actuate the ratchet 18 and stator 11 in opposite directions. Only one of the pawls is permitted to be effective at any one time, the selection being controlled by a cam mechanism which can hold one pawl from engagement with the ratchet, while permitting the other pawl to engage the ratchet teeth. As disclosed in the drawings, a cam shaft 24 is pivotally mounted in the outer portion of the lever and also in a plate or bearing washer 25 disposed around a boss 26 on the stator and confined within a recess 27 in the operating lever. A radial cam 28 is secured to the shaft 24, which can be operated by an external lever 29 secured to the shaft, in order to hold one of the pawls out of engagement with the ratchet, while allowing the other pawl to engage the ratchet teeth. The lever 29 and cam 28 may be actuated in a clockwise direction, as disclosed in Fig. 2, to remove the pawl 21 from engagement with the teeth 19, allowing the spring 23 to engage the other pawl 20 with the teeth.

It is apparent that actuation of the operating lever 10 in one direction will cause one of the pawls 20 or 21 to engage the ratchet teeth 19, to rotate the ratchet 18 and the stator 11. Motion of the operating lever in the opposite direction will automatically disconnect the selected operating pawl from the ratchet teeth, the pawl merely ratcheting freely over the teeth without imparting any motion to the stator. Thus, by appropriately oscillating the operating lever 10, unidirectional motion can be transmitted to the ratchet wheel 18 and the stator 11 secured thereto.

The unidirectional motion of the stator 11 is transmittable to a rotor 30 confined within the stator or housing. Integral with this rotor, or otherwise suitably secured thereto, is a spindle 31 extending outwardly through an end closure member or plate 32 of the stator 11, the closure member being suitably secured to the stator, as by using screws (not shown). The spindle has a non-circular end 33 for receiving a suitable member 34 to be coupled to the threaded fastening element. As disclosed, a wrench socket is mounted on the end 33 of the spindle to receive a nut or bolt head (not shown), for the purpose of tightening the latter.

The stator 11 has a plurality of diametrically opposed radial vanes 35 extending inwardly from its inner wall 36 toward the periphery 37 of the rotor 30. The rotor has a corresponding number of diametrically opposed radial vanes 38 extending outwardly from its central portion and terminating adjacent the inner wall 36 of the stator. The stator vanes 35 extend longitudinally from its end wall 39, which connects the periphery of the stator housing 11 with its hub portion 12, and snugly engages the end closure member 32, so as to preclude the leakage of fluid along the end portions of the stator vanes. The rotor vanes 38 are substantially the same length as the stator vanes, the ends of the rotor vanes making a close sliding fit with the end members 39, 32 of the stator, the outer ends of the vanes 38 making a close sliding fit with the inner wall 36 of the stator. The inner ends of the stator blades 35 also make a close sliding fit with the periphery 37 of the rotor. The sliding fits are sufficient to substantially preclude leakage of fluid around the vanes.

The motion imparted by the operating lever 10 to the stator 11, through the one-way ratchet or overrunning clutch device 18—21, is transmitted from the stator vanes 35 to the rotor vanes 38 by face contact between the two, and from the rotor 30 to the spindle 31 and wrench socket 34. In effect, during the oscillation of the lever 10, the vanes 35, 38 engage one another, so that the motion imparted to the ratchet 18 is solidly transmitted to the spindle 31 and the wrench socket 34. The operator can oscillate the handle 10 a sufficient number of times until the threaded fastening element, such as a nut mounted in the socket 34, is tightened to a preliminary extent. With the use of the apparatus disclosed, it is unnecessary for the operator to exert much force on the handle portion of the operating lever 10, since power means are provided to provide the final tightening of the threaded fastening element to a great degree of accuracy. Such power means is constituted by the stator 11 and rotor 30, which together form a fluid motor for imparting a further torque to the rotor 30, spindle 31 and the wrench socket 34.

Fluid under pressure, such as oil or compressed air, is directed to the arcuate spaces 40 between the stator vanes 35 and rotor vanes 38 to shift the rotor vanes and rotor 30 arcuately through a partial revolution with respect to the stator vanes 35 and the stator housing 11 itself. Such fluid under pressure is derived from a suitable source, the fluid passing through a line 41 and through a regulator valve 42, which can determine the pressure of the fluid directed to the apparatus, and on through another line 43 to a three-way control valve 44, which may be conveniently mounted upon the operating handle 10 of the oscillatable lever 10.

The particular valve 44 is conventional, and its details of construction are not necessary to an understanding of the invention. Its outer casing 45 is provided with an inlet port 46, an exhaust port 47 and an outlet port 48, connected to a line 49 leading to a tubular swivel member 50 pilotable within a bore 51 in the rotor 30 of the fluid motor. This bore communicates with a pair of diametrically opposed ports 52 that open outwardly into the spaces 40 between the stator and rotor vanes 35, 38 immediately adjacent the rear faces 53 of the rotor vanes. As disclosed in the drawings, it is desired to rotate the rotor 30 and spindle 31 in a clockwise or right-hand direction, in order to operate upon right-hand threaded fastening elements, and for that reason the radial rotor ports 52 open outwardly into the fluid motor housing immediately adjacent the rear faces 53 of the rotor vanes.

Leakage of fluid from the housing 11 is precluded by suitable seals. A seal is provided between the cylindrical portion of the stator 11 and the end closure 32, this seal being constituted by a rubber or rubber-like O ring 60 disposed in a groove 61 in the closure 32 and engaging the inner wall 36 of the stator. A similar type of seal ring 62 is disposed in an internal circumferential groove 63 in the end closure and engageable with the periphery of the spindle 31, to preclude leakage of fluid in a forward direction from the housing 11. Fluid leakage in a rearward direction from the housing is prevented by providing a rubber O ring type of seal 64 in the stator near the end wall 39 of the latter, this seal engaging the periphery of the rearward portion of the rotor 30. Fluid leakage between the swivel 50 piloted within the rotor bore 51 is prevented by a rubber O ring type of seal 65 in a peripheral groove 66 in the rotor 30 and engaging the exterior of the line or swivel tube 50. This latter member is retained in position by an end plate 67 suitably secured to the end of the rotor, and overlying a flange 68 provided on the tube 50, the flange 68 being disposed within a counterbore or recess 69 in the end of the rotor.

The three-way valve 44 includes a valve member 70, which can be turned arcuately, or rotated, by a suitable lever 71 attached thereto, to place the valve member 70 in the position disclosed in Fig. 4, in which fluid under pressure is permitted to pass from the source through the line 41 and regulator valve 42 to the inlet line 43 and into the line 49 leading to the rotor passage 51, the fluid under pressure then passing outwardly through the rotor port 52, acting upon the radial rotor vanes 38 to move the rotor arcuately, and correspondingly impart a turning effort to the spindle 31, wrench socket 34 and the threaded fastening element confined within the latter. Any fluid on the low pressure side of the rotor vanes 38 can escape through the bleeder holes 52a in the stator. The valve can be manipulated to turn the valve member 70 substantially ninety degrees from the position illustrated in Fig. 4, which will close the fluid pressure line 43 and open the fluid motor line 49 to communication with the exhaust passage 47 in the valve body 45. When this occurs, the fluid under pressure within the fluid motor can exhaust through the line 49 to atmosphere. Following exhausting of the fluid motor, the rotor 30, spindle 31 and wrench socket 34 are returned to their initial positions by a coil spring 72 encompassing the spindle 31 and having one end secured to a stationary pin 73 fixed to the end closure 32 of the stator, the other end of the coil spring being suitably fixed to the spindle 31.

It is evident that the rotor 30 can only turn arcuately a fraction of a revolution, as through an arc of less than 180 degrees, in the design disclosed in the drawings. Accordingly, it is important to advise the operator the extent of arcuate movement of the rotor 30 with respect to the stator 11, so that if the threaded fastening element has been insufficiently tightened, that fact will be conveyed to the operator, enabling him to manipulate the three-way valve 44 to release the pressure in the stator 11, which allows the latter to be rotated by the spring 72 to bring its vanes 35 to the initial position adjacent the rotor vanes 38 disclosed in Fig. 3. Thereupon, the three-way valve 44 is manipulated again to enable the fluid under pressure to apply a further turning effort on the rotor 30, spindle 31, socket 34 and threaded fastening element, until the fluid motor stalls. When the stalling occurs, the threaded fastening element has been tightened to the predetermined torque, since the regulator valve 42 is adjusted to provide the proper fluid pressure to tighten the threaded fastening element to the desired and accurate extent.

The indication of relative arcuate movement between the rotor 30 and stator 11 is furnished by securing a suitable pointer 75 to the swivel retaining disc 67, which extends over suitable indicia or markings (not shown) on the end 12a of the stator hub 12. If the fluid motor stalls in accomplishing the final tightening of the threaded fastening element before the pointer 75 moves over the stator markings to the full extent, then the operator need not reverse the mechanism for that particular threaded fastening element, since the fact of stalling of the fluid motor will have secured the desired tightening of the threaded fastening element.

In the operation of the device, the socket 34 is disposed upon a threaded fastening element, such as a nut, and the operating handle 10 oscillated to cause intermittent engagement of the pawl 20 with the ratchet teeth 19, imparting unidirectional motion to the stator 11, rotor 30, spindle 31 and wrench socket 34, to run down the nut and secure its preliminary tightening against the work. When the preliminary tightening has occurred, then the operator manipulates the valve 44, to place it in the position disclosed in Fig. 4, whereupon fluid under the desired selected pressure can flow into the fluid motor and act upon the rotor vanes 38, rotating the rotor 30, spindle 31 and wrench socket 34 to the desired further extent. The reactive force of the fluid under pressure bears against the stator blades 35 and through the ratchet 18 and power pawl 20 exerts its force on the operating lever 10. However, the operator can be relieved of overcoming the reaction torque by suitably bearing the ratchet handle 10 against a stationary member.

The operator is able to swing the handle 10 to any desired position before allowing fluid under pressure to flow to the fluid motor, because of the presence of the power pawl 20 and the ability to release this pawl 20 whenever desired, through actuation of the lever 29 and pawl selecting cam 28. The indicator or pointer 75 will advise the operator that the threaded fastening element has been tightened to the desired extent upon stalling of the fluid motor, whereupon the operator can remove the socket 34 from the threaded fastening element, allowing the return spring 72 to eventually rotate reversely the spindle 31 and rotor 30, to place the rotor vanes 38 again in their initial position adjacent the stator vanes 35, in which position the fluid motor has its parts related to perform another tightening operation on the same or another threaded fastening element.

In the event the operator desires to loosen a threaded fastening element, the lever 29 and cam 28 are manipulated to remove the power pawl 20 from engagement with the ratchet teeth 19, allowing the spring 23 to engage the other power pawl 21 with the ratchet teeth. This places the overrunning clutch in a position for reverse rotation, whereupon the operating handle 10 can be grasped by the operator and sufficient force exerted thereon to loosen the threaded fastening element, this force being transmitted through the pawl 21 and ratchet 18 to the stator housing 11, and from the stator vanes 35 mechanically to the rotor vanes 38 contacted thereby, the rotor 30, spindle 31 and wrench socket 34 being turned to effect loosening of the threaded fastening element. During this loosening operation, the handle 10 can be oscillated, the stator 11, rotor 30, spindle 31 and wrench socket 34 being turned in only one direction, inasmuch as reverse rotation of the operating handle 11 will be accompanied by free ratcheting of the pawl 21 over the ratchet teeth 19.

It is, accordingly, apparent that an apparatus for tightening threaded fastening elements has been provided which is unaffected by the skill of the operator, since the final torque tightening is dependent upon the pressure of the fluid directed to the fluid motor. The operator is required to do a lesser amount of work himself, since he need only tighten the threaded fastening element to a preliminary extent, the final tightening being performed by the fluid motor itself. As stated above, the operator need not even take the reaction torque during use of the fluid motor, since the operating handle 10 can easily be brought to bear or rest against a suitable stop. By virtue of the mechanism, and the fact that the initial rundown of the threaded fastening element can take place as a result of ratcheting or oscillating of the operating lever 10, less operating space is required. Since the final torque tightening is accomplished by the fluid power unit, a long operating lever 10 is not necessary, all of which further contributes to the requirement for less operating space in using the apparatus. In addition, the fact that the final torque tightening is done by the power device makes the apparatus useful in places that would be dangerous or impossible for the operator to supply sufficient force himself. The final torque tightening occurs in a uniform manner under the influence of the fluid under pressure. Since the threaded fastening element and the rotor 30, spindle 31 and socket 34 need only be turned to a small extent in achieving the final tightening, it is evident that the parts move relatively slowly, and, therefore, do not introduce any inertia forces into the operation, which might result in an inaccurate tightening of the threaded fastening element. The torque is applied in an accurate manner, because the final torque is continuous, being free from intermittent or jerk-like applications of effort. Its accuracy is also due to the fact that the operator's skill does not play any part in achieving the final tightening.

The inventor claims:

1. In apparatus for tightening threaded fastening elements: a driven member; a fluid motor of the stall type operatively connected to said driven member to rotate the same to tighten a threaded fastening element to a predetermined torque at which said motor will stall; means for mechanically rotating said fluid motor comprising an overrunning clutch through which mechanical motion is imparted to said fluid motor to rotate said driven member to tighten the threaded fastening element to a torque less than the predetermined torque; and means for feeding fluid under pressure to said fluid motor to effect fluid rotation of said motor with fluid pressure being applied to said motor until said motor stalls.

2. In apparatus for tightening threaded fastening elements: a driven part; a fluid motor of the stall type comprising a fluid actuated rotor member operatively connected to said driven part to rotate the same to tighten a threaded fastening element to a predetermined torque at which said rotor will stall; a stator member coacting with said rotor member; means for mechanically rotating one of said members comprising an overrunning clutch through which motion is imparted to said one of said members to rotate said driven member to tighten the threaded fastening element to a torque less than the predetermined torque; and means for feeding fluid under pressure to said fluid motor to effect fluid rotation of said rotor with fluid under pressure being applied to said rotor until said rotor stalls.

3. In apparatus for tightening threaded fastening elements: a driven member; a fluid motor of the stall type comprising a rotor operatively connected to said member to rotate the same to tighten a threaded fastening element to a predetermined torque at which said rotor will stall, a stator coacting with said rotor to rotate the same; means for rotating said stator to cause said stator to rotate said rotor to rotate said driven member to tighten the threaded fastening element to a torque less than a predetermined torque; and means for feeding fluid under pressure to said motor to effect fluid rotation of said rotor relative to said stator with fluid under pressure being applied to said rotor until said rotor stalls.

4. In apparatus for tightening threaded fastening elements: a driven member; a fluid motor of the stall type operatively connected to said driven member to rotate the same to tighten a threaded fastening element to a predetermined torque at which said motor will stall; an operating lever; an overrunning clutch connecting said lever to said fluid motor whereby oscillation of said lever produces unidirectional rotary motion of said motor to rotate said driven member to tighten the threaded fastening element to a torque less than the predetermined torque; and means for feeding fluid under pressure to said motor to effect fluid rotation of said motor with fluid pressure being applied to said motor until said motor stalls.

5. In apparatus for tightening threaded fastening elements: a driven part; a fluid motor of the stall type comprising a fluid actuated rotor member operatively connected to said part to rotate the same to tighten a threaded fastening element to a predetermined torque at which said rotor will stall, a stator member coacting with said rotor member; an operating lever; an overrunning clutch connecting said lever to one of said members whereby oscillation of said lever produces unidirectional rotary motion to said one of said members to rotate said driven member to tighten the threaded fastening element to a torque less than the predetermined torque; and means for feeding fluid under pressure to said motor to effect fluid rotation of said rotor with fluid under pressure being applied to said rotor until said rotor stalls.

6. In apparatus for tightening threaded fastening elements: a driven member; a fluid motor including a rotatable element operatively connected to said driven member to rotate the same; means for rotating said fluid motor comprising an overrunning clutch through which motion is imparted to said fluid motor; means for feeding fluid under pressure to said motor to rotate said rotatable element in one direction, said pressure being maintained in said motor for all operating positions of said rotatable element when rotating said driven member to tighten the threaded fastening element; and spring means for rotating said rotatable element in the opposite direction.

7. In apparatus for tightening threaded fastening elements: a driven member; a fluid motor comprising a rotor operatively connected to said member to rotate the same, a stator coacting with said rotor; means for rotating said stator comprising an overrunning clutch through which motion is imparted to said stator; means for feeding fluid under pressure to said motor to rotate said rotor in one direction with respect to said stator, said pressure being maintained in said motor for all operating positions of said rotor when rotating said driven member in a direction to tighten the threaded fastening element; and spring means for rotating said rotor in the opposite direction.

8. In apparatus for tightening threaded fastening elements: a driven member; a fluid motor comprising a rotor operatively connected to said member to rotate the same and having one or more radially extending vanes, a stator having one or more radially extending vanes coacting with said one or more rotor vanes to rotate said rotor; means for feeding fluid under pressure to said vanes to rotate said rotor relative to said stator, said pressure being maintained in said motor for all operating positions of said rotor when rotating said driven member in a direction to tighten the threaded fastening element; and means for rotating said stator comprising an overrunning clutch through which motion is imparted to said stator and from said stator to said rotor.

9. In apparatus for tightening threaded fastening elements: a driven member; a fluid motor comprising a rotor operatively connected to said member to rotate the same and having one or more radially extending vanes, a stator having one or more radially extending vanes coacting with said one or more rotor vanes; means for feeding fluid under pressure to said vanes to rotate said rotor in one direction relative to said stator, said pressure being maintained in said motor for all operating positions of said rotor when rotating said driven member in a direction to tighten the threaded fastening element; spring means for rotating said rotor in the opposite direction; an operating lever; and an overrunning clutch connecting said lever to said stator.

10. In apparatus for tightening threaded fastening elements: a driven member; a fluid motor comprising a rotor operatively connected to said member to rotate the same and having one or more radially extending vanes, a stator having one or more radially extending vanes coacting with said one or more rotor vanes; means for feeding fluid under pressure to said vanes to rotate said rotor relative to said stator, comprising a tubular member swivelly connected to said rotor, said pressure being maintained in said motor for all operating positions of said rotor when rotating said driven member in a direction to tighten the threaded fastening element; and means for rotating said stator comprising an overrunning clutch through which motion is imparted to said stator.

References Cited in the file of this patent
UNITED STATES PATENTS

| | | |
|---|---|---|
| 1,812,816 | Weaver | June 30, 1931 |
| 2,202,402 | Rueb | May 28, 1940 |
| 2,292,146 | Meunier | Aug. 4, 1942 |
| 2,457,969 | Anderson | Jan. 4, 1949 |
| 2,484,364 | Whitledge | Oct. 11, 1949 |
| 2,569,244 | Larson | Sept. 25, 1951 |
| 2,702,489 | Wallace | Feb. 22, 1955 |